(12) United States Patent
Pedersen et al.

(10) Patent No.: US 11,038,606 B1
(45) Date of Patent: Jun. 15, 2021

(54) SOURCE DISCRIMINATION OF FLUCTUATING RADIO SIGNALS

(71) Applicant: Government of the United States, as represented by the Secretary of the Air Force, Kirtland AFB, NM (US)

(72) Inventors: Todd R. Pedersen, Albuquerque, NM (US); Ronald G. Caton, Tijeras, NM (US); R. Todd Parris, Albuquerque, NM (US); Kathleen F. Shurkin, Albuquerque, NM (US)

(73) Assignee: The Government of the Unites States of Ameroica as represented by the Secretary of the Air Force, Kirtland AFB, NM (US)

( * ) Notice: Subject to any disclaimer, the term of this patent is extended or adjusted under 35 U.S.C. 154(b) by 0 days.

(21) Appl. No.: 16/818,874

(22) Filed: Mar. 13, 2020

Related U.S. Application Data

(60) Provisional application No. 62/836,215, filed on Apr. 19, 2019.

(51) Int. Cl.
*H04B 17/00* (2015.01)
*H04B 17/345* (2015.01)
*H04W 24/08* (2009.01)

(52) U.S. Cl.
CPC .......... *H04B 17/345* (2015.01); *H04W 24/08* (2013.01)

(58) Field of Classification Search
CPC ..... H04B 17/345; H04W 24/08; H04W 24/10
USPC ..................................................... 455/67.13
See application file for complete search history.

(56) References Cited

U.S. PATENT DOCUMENTS

| 7,375,680 | B2 | 5/2008 | Watson et al. | |
| 7,586,891 | B1* | 9/2009 | Masciulli | H04L 45/122 370/344 |
| 7,941,166 | B2* | 5/2011 | Costa | H04B 7/2687 455/502 |
| 8,938,201 | B2* | 1/2015 | Boulton | G01S 5/0221 455/67.14 |
| 9,244,174 | B2 | 1/2016 | Averin et al. | |
| 9,488,729 | B2* | 11/2016 | Averin | G01S 19/07 |
| 9,678,212 | B2 | 6/2017 | Scheitlin et al. | |

(Continued)

OTHER PUBLICATIONS

Briggs et al., "On the Variation of Radio Star and Satellite Scintillation with Zenith Angle," J. Atmos. Terr. Phys., 25, 339-365, (1963).

(Continued)

*Primary Examiner* — Kathy W Wang-Hurst
*Assistant Examiner* — Max Mathew
(74) *Attorney, Agent, or Firm* — AFNWC/JA; David L. Narciso (57) ABSTRACT

A method for automatically identifying the source of fluctuations in a trans-ionospheric radio signal, by acquiring a portion of the radio signal and computing statistics on it, including mean, standard deviation, scintillation index, skew, kurtosis, decorrelation time, and spectral slope. The scintillation index, skew, kurtosis, decorrelation time, and spectral slope are compared to thresholds, and based at least in part upon the comparisons, at least one condition present in the portion of the radio signal is selectively indicated to an operator, where the condition is selected from the group of no signal fluctuations, RF interference, multipath interference, noise, and ionospheric scintillation.

20 Claims, 3 Drawing Sheets

(56) References Cited

U.S. PATENT DOCUMENTS

| | | | |
|---|---|---|---|
| 10,324,160 B2 | 6/2019 | Jacklin et al. | |
| 10,396,889 B2 | 8/2019 | Floch et al. | |
| 2004/0203441 A1* | 10/2004 | Smith | H04W 24/00 455/67.11 |
| 2009/0149133 A1* | 6/2009 | Yoneyama | H04L 1/0019 455/67.13 |
| 2015/0234093 A1 | 8/2015 | Crowley et al. | |
| 2016/0183098 A1* | 6/2016 | Lim | H04L 41/22 455/12.1 |
| 2017/0139050 A1* | 5/2017 | Curran | G01S 19/40 |
| 2017/0276793 A1* | 9/2017 | Memarzadeh | G01S 19/258 |
| 2019/0056505 A1* | 2/2019 | Morley | G01S 19/43 |
| 2019/0090246 A1* | 3/2019 | Jagannath | H04W 24/02 |
| 2021/0022085 A1* | 1/2021 | Abdelmonem | H04L 5/006 |
| 2021/0022086 A1* | 1/2021 | Abdelmonem | H04W 52/243 |

OTHER PUBLICATIONS

Carrano et al., "On the Mutual Coherence Function for Transionospheric Waves and its Utility for Characterizing Ionospheric Irregularities with a GNSS Scintillation Monitor," Proc. 2015 ION Pacific PNT Conference, Honolulu, Hawaii, Apr. 20-23, 2015.

Carrano et al., "Temporal Decorrelation of GPS Satellite Signals due to Multiple Scattering from Ionospheric Irregularities," Proceedings of the 23rd International Technical Meeting of the Satellite Division of the Institute of Navigation, Portland, OR, Sep. 21-24, 2010.

Caton, R.G., T. R. Pedersen, R. T. Parris, and K. Shurkin, Automated Quality Control Algorithms for Ionospheric Scintillation Measurements, presented at the Ionospheric Effects Symposium, Alexandria, Virginia, May 10, 2017.

Linty et al., "Detection of GNSS Ionospheric Scintillations Based on Machine Learning Decision Tree," IEEE Transactions on Aerospace and Electronic Systems vol. 55, No. 1 Feb. 2019, pp. 303-317.

Makarenkova et al., "Multifractal Phase Screen Model for Scintillation of Transionospheric Signals," 2nd URSI AT-RASC, Gran Canaria, May 28-Jun. 1, 2018.

Prikryl et al., Probabilistic forecasting of ionospheric scintillation and GNSS receiver signal tracking performance at high latitudes, Annals of Geophysics, 56, 2, 2013, R0222; doi:10.4401/ag-6219.

Redmon et al., "A Forecasting Ionospheric Real-timeScintillation Tool (FIRST)," Space Weather, vol. 8, S12003, doi:10.1029/2010SW000582, 2010.

The Satellite-Based Augmentation Systems Ionospheric Working Group (2012), Ionospheric Scintillations: How. Irregularities in Electron Density Perturb Satellite Navigation Systems, GPS World pp. 44-50, Apr. 2012.

Xu et al., "A Semi-Open Loop GNSS Carrier Tracking Algorithm for Monitoring Strong Equatorial Scintillation," IEEE Transactions on Aerospace and Electronic Systems vol. 54, No. 2 Apr. 2018, pp. 722-738.

Zhang et al., "A Framework of Integrated Service System of Ionospheric Scintillation Information," 978-1-5386-7302-71181$31.00 ©2018 IEEE.

\* cited by examiner

SOURCE DISCRIMINATION OF FLUCTUATING RADIO SIGNALS

RELATED APPLICATIONS

This application claims all rights and priority on prior U.S. provisional patent application Ser. No. 62/836,215 filed 2019 Apr. 19, the entirety of the disclosure of which is incorporated herein by reference.

GOVERNMENT RIGHTS STATEMENT

The invention described herein may be manufactured and used by or for the Government of the United States for all governmental purposes without the payment of any royalty.

FIELD OF THE INVENTION

This invention relates to the field of radio communications. More particularly, this invention relates to determining the sources of fluctuations in trans-ionospheric radio signals, whether for communication or other purposes such as navigation or radar.

BACKGROUND OF THE INVENTION

Having accurate measurements of the characteristics of radio frequency signals that are traveling through the ionosphere between earth and space (in either direction) is important so as to monitor the proper functioning of the transmit and receive equipment and for detecting and measuring ionospheric scintillation, or fluctuations in signal power and phase produced by turbulence in the ionospheric plasma. Prior-art monitoring systems are unable to reliably distinguish between the various different sources of these fluctuations in the radio signals.

Signal fluctuations on such links can result from performance problems with the transmit or receive equipment, accidental or intentional radio frequency (RF) interference, reflections off the ground surface or nearby objects (multipath propagation), or scintillation caused by turbulence in the ionosphere.

System operators may have requirements to keep system power or phase within specific limits and, therefore, will monitor the signals to ensure that the system performance is within an allowable range. RF interference picked up at the monitoring location can create apparent fluctuations in signal parameters that are independent of the actual performance of the transmitter being monitored. If signal monitoring is done near the receiving end of the link, and the link passes through the ionosphere, fluctuations in the signal caused by ionospheric scintillation might be misinterpreted as problems with the transmitter.

Other users of trans-ionospheric channels may be primarily interested in measuring ionospheric scintillation or turbulence, in which case fluctuations caused by local radio interference or multipath can create false readings. Conversely, some receivers or monitoring systems may attempt to notify operators or users of interference, but are unable to distinguish between true interference and ionospheric scintillation.

In regard to scintillation monitoring, prior-art scintillation sensors typically assume that all fluctuations in the signal are the result of ionospheric turbulence. Furthermore, scintillation measurement systems operated in the equatorial region typically assume that natural scintillation is not present during daytime hours and often do not even record or archive data during these periods, in spite of the fact that the study of daytime scintillation, by virtue of its unusual nature, could provide a high payoff to researchers.

What is needed, therefore, is a system for identifying and reporting the various sources of fluctuation in a trans-ionospheric radio signal, such as interference, multipath, noise, and ionospheric scintillation.

SUMMARY OF THE INVENTION

The above and other needs are met by a method for automatically identifying the source of fluctuations in a trans-ionospheric radio signal, by acquiring a portion of the radio signal and computing statistics on it, including mean, standard deviation, scintillation index, skew, kurtosis, decorrelation time, and spectral slope. The scintillation index, skew, kurtosis, decorrelation time, and spectral slope are compared to thresholds, and based at least in part upon the comparisons, at least one condition present in the portion of the radio signal is selectively indicated to an operator, where the condition is selected from the group of no signal fluctuations, RF interference, multipath interference, noise, and ionospheric scintillation.

In some embodiments according to this aspect of the invention, if the scintillation index is greater than a first threshold, and the decorrelation time is between a second threshold and a third threshold, and the slope is between a fourth threshold and a fifth threshold, then a condition of ionospheric scintillation is indicated. In some embodiments, if an absolute value of the skew is greater than a sixth threshold, then a condition of RF interference is indicated. In some embodiments, if an absolute value of the kurtosis is greater than a seventh threshold, then a condition of RF interference is indicated.

In some embodiments, a multipath slope (defined herein as a spectral slope value that is used for multipath determination) is computed using the decorrelation time and the spectral slope over a spectral range of about 0.0005 hertz to about 0.01 hertz, and an average power is computed from a power spectrum over a spectral range of about 0.0005 hertz to about 0.01 hertz, and if the decorrelation time is greater than an eighth threshold, and the multipath slope is less than or equal to a ninth threshold, and the average power is greater than or equal to a tenth threshold, then a condition of multipath interference is indicated.

In some embodiments, a multipath slope is computed using the decorrelation time and the spectral slope over a spectral range of about 0.0005 hertz to about 0.01 hertz, and if the multipath slope is less than or equal to an eleventh threshold, then a condition of multipath interference is indicated. In some embodiments, if a condition of at least one of RF interference, multipath interference, and ionospheric scintillation is not indicated, then a condition of noise is indicated.

According to another aspect of the invention there is described a non-transitory, computer-readable storage medium having stored thereon a computer program with a set of instructions for causing a computing device to indicate radio signal conditions by performing the following steps. A portion of the radio signal is acquired, and statistics on the portion of the radio signal are computed, including mean, standard deviation, scintillation index, skew, kurtosis, decorrelation time, and spectral slope. The scintillation index, skew, kurtosis, decorrelation time, and spectral slope are compared to thresholds, and based at least in part upon the comparisons, at least one condition present in the portion of the radio signal is selectively indicated, selected from the group of no signal fluctuations, RF interference, multipath interference, noise, and ionospheric scintillation.

In some embodiments according to this aspect of the invention, the instructions include indicating a condition of ionospheric scintillation if the scintillation index is greater than a first threshold, and the decorrelation time is between a second threshold and a third threshold, and the slope is between a fourth threshold and a fifth threshold. In some embodiments, the instructions include indicating a condition of RF interference if an absolute value of the skew is greater than a sixth threshold. In some embodiments, the instructions include indicating a condition of RF interference if an absolute value of the kurtosis is greater than a seventh threshold.

In some embodiments, the instructions include computing a multipath slope using the decorrelation time and the spectral slope over a spectral range of about 0.0005 hertz to about 0.01 hertz, computing an average power from a power spectrum over a spectral range of about 0.0005 hertz to about 0.01 hertz, and indicating a condition of multipath interference if the decorrelation time is greater than an eighth threshold, and the multipath slope is less than or equal to a ninth threshold, and the average power is greater than or equal to a tenth threshold.

In some embodiments, the instructions include computing a multipath slope using the decorrelation time and the spectral slope over a spectral range of about 0.0005 hertz to about 0.01 hertz, and indicating a condition of multipath interference if the multipath slope is less than or equal to an eleventh threshold. In some embodiments, the instructions include indicating a condition of noise if a condition of at least one of RF interference, multipath interference, and ionospheric scintillation is not indicated.

According to yet another aspect of the invention there is described an apparatus for automatically identifying the source of fluctuations in a trans-ionospheric radio signal. An antenna receives a trans-ionospheric radio signal that is passed to a receiver. A processor computes statistics on the radio signal, including mean, standard deviation, scintillation index, skew, kurtosis, decorrelation time, and spectral slope, and compares the statistics to thresholds. A user interface selectively indicates at least one condition present in the radio signal, selected from the group of no signal fluctuations, RF interference, multipath interference, noise, and ionospheric scintillation, based at least in part upon the comparisons. A memory stores the thresholds.

In some embodiments according to this aspect of the invention, the processor indicates a condition of ionospheric scintillation if the scintillation index is greater than a first threshold, and the decorrelation time is between a second threshold and a third threshold, and the slope is between a fourth threshold and a fifth threshold. In some embodiments, the processor indicates a condition of RF interference if an absolute value of the skew is greater than a sixth threshold. In some embodiments, the processor indicates a condition of RF interference if an absolute value of the kurtosis is greater than a seventh threshold.

In some embodiments, the processor computes a multipath slope using the decorrelation time and the spectral slope over a spectral range of about 0.0005 hertz to about 0.01 hertz, and an average power from a power spectrum over a spectral range of about 0.0005 hertz to about 0.01 hertz, and indicates a condition of multipath interference if the decorrelation time is greater than an eighth threshold, and the multipath slope is less than or equal to a ninth threshold, and the average power is greater than or equal to a tenth threshold, and indicates a condition of multipath interference if the multipath slope is less than or equal to an eleventh threshold. In some embodiments, the processor indicates a condition of noise if a condition of at least one of RF interference, multipath interference, and ionospheric scintillation is not indicated.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION OF THE INVENTION

Various embodiments of the present invention take advantage of several distinguishing features of the various sources of fluctuation on radio links and use a combination of parameters to determine the sources of observed signal fluctuations, with high accuracy and without requiring expert human-in-the-loop analysis. These embodiments can be tailored to specific systems and incorporated into monitoring or warning software to prevent misinterpretation of observed fluctuations, and thereby aid operators in either properly identifying possible system anomalies or reporting interference hampering their operations.

Embodiments of the present invention compute statistical parameters that are selected by their sensitivity to the different physical mechanisms that are behind the various causes of signal fluctuation. The method then combines the parameters, compares them to derived thresholds, performs logic to eliminate incompatible causes, and then reports the actual cause or causes of the fluctuations with a high degree of reliability. In various embodiments, the method is written into or supplied as a subroutine to signal monitoring or post-processing systems, scintillation measurement systems, or firmware of a receiving device that would benefit from both an awareness of and a discrimination between the various factors that cause signal fluctuations.

Embodiments of the invention include a method that receives as input a stream of amplitude and phase samples from a desired trans-ionospheric signal. The stream, in some embodiments, is down-sampled or decimated to the 10-100 Hz range, as the fluctuations of interest tend to be below the specific modulation containing the information content of the signal. Signal power in some embodiments is converted to a linear scale, if originally in units of decibels, and the phase is detrended to reduce the effects of relative motion between the transmitter and receiver.

Standard statistical parameters, such as the mean, standard deviation, skew, and kurtosis, are computed over an interval of the signal that is long enough to adequately capture the primary signal fluctuations of interest. The specific time interval will vary depending on the degree of relative motion between the transmitter, receiver, and ionosphere. For ionospheric scintillation on fixed links, about one minute is typically adequate. Additional parameters to be computed include the decorrelation time and the spectral slope or power spectral density. The amplitude scintillation index ($S_4$), defined as the square root of the standard deviation of the signal amplitude divided by the mean amplitude $$\left( S_4 = \sqrt{\frac{\langle I^2 \rangle - \langle I \rangle^2}{\langle I \rangle^2}} \right),$$

where I is signal amplitude in linear units, is also computed from the mean and standard deviation, and is used as a normalized unitless measure of signal fluctuation.

These statistical metrics are chosen based on the physics of the situation, namely that over a certain range of time, scintillation-generated fluctuations typically exhibit a power-law distribution with an exponent much larger in magnitude than the 1.0 value observed for white noise. Scintillation characteristics also demonstrate a preferred temporal scale depending on the wavelength, size of ionospheric irregularities, and relative motion of the transmitter, ionosphere, and receiver.

Additionally, average power is generally conserved under the diffraction processes that create scintillation. RF interference, on the other hand, lacks any coherence with the transmitted signal, and produces either a net increase in signal power (when total power at a frequency is being measured) or a net decrease (when the signal-to-noise ratio (SNR) across a band is used as a proxy for the absolute signal strength and the interfering signal appears as part of the noise).

The preferred temporal scale for scintillation is captured by the decorrelation time, defined as the lag at which the correlation of the signal with itself drops below 0.5. The spectral slope computation reflects the power-law distribution of scintillation fluctuations. Skew and kurtosis are measures of asymmetry in the distribution, and are therefore excellent indicators of intermittent interference, such as noise spikes.

After computing the required parameters for a sampling interval, the method then tests the various parameters against their thresholds to determine the presence of RF interference and ionospheric scintillation that impact the signal strength.

First, the $S_4$ index is computed to determine whether fluctuations are significant enough to warrant further analysis. When the $S_4$ exceeds a chosen threshold, the decorrelation time and spectral slope are calculated and compared to maximum and minimum thresholds, which are established empirically by expert analyses of large sets of measurements. The specific values may vary depending on the frequency of the signal (typically in the range from VHF through L band), the distance between the transmitter, receiver, and ionosphere, relative motion between the transmitter, ionosphere, and receiver, and orientation of the link relative to the magnetic field.

If both the decorrelation time and spectral slope fall between the maximum and minimum thresholds, the algorithm returns a positive indication for the presence of ionospheric scintillation during the sample time interval. If either the slope or decorrelation time are outside the thresholds, the algorithm returns a negative scintillation assessment. If the slope (generally negative values) is greater than the upper bound for scintillation, the determination is white noise. If the decorrelation time is larger than the maximum threshold for scintillation, the fluctuations are identified as multipath. If decorrelation time is lower than the minimum, the identification is white noise.

In addition to the scintillation assessment, the method also determines whether the absolute values of both the skew and kurtosis are less than the established thresholds. If either is greater, the method flags the interval as containing RF interference.

The net outputs of the algorithm are therefore indicators of the presence or absence of four possible contributing factors, if significant fluctuations are observed: 1) ionospheric scintillation, 2) RF interference, 3) multipath propagation, or, 4) white noise. Identification of combinations of multiple phenomena present at the same time are in general possible, although with the present definitions some outputs are mutually exclusive.

The most likely use case for embodiments of the present invention would be inclusion in the software or firmware of monitoring systems where the outputs could be used to help operators determine the true performance of their system. The method is also expected to find use in purpose-built scintillation measurement and monitoring systems to ensure quality control of the measurements.

Some embodiments include down-sampling raw signal amplitude and phase measurements (for convenience and speed of processing), performing statistical processing over all measurements in a specified temporal interval, comparing the statistical parameters to sets of predetermined thresholds, and finally capturing the flags output by the method. This would most likely be carried out as a routine in a larger signal monitoring application that already has a stream of digital measurements of signal amplitude and phase, but could also be implemented on a stand-alone processor tapping off the target signal with a splitter, with outputs perhaps shown as colored LEDs on the box. It could also be implemented as pure software and run off-line against sets of recent or past digital data or raw RF recordings.

Various embodiments rely on three core components of spectral slope, decorrelation time, and a measurement of asymmetry in the signal fluctuations. The asymmetry measurement could be skew or kurtosis or a combination of the two, or some other parameter capturing asymmetry in fluctuations. While this disclosure specifically describes an embodiment based on signal amplitude, similar logic applies for processing of phase measurements, with the primary difference being that phase must typically first be detrended to eliminate the effects of relative motion between the transmitter and the receiver, and that cycle slips, if any, must be resolved.

The specific thresholds for phase measurements can be expected to be different, in general, for those from amplitude measurements. But in particular, the decorrelation time and spectral slope remain key parameters in some embodiments for identification of ionospheric scintillation. One embodiment of the method uses fixed thresholds for spectral slope and decorrelation time, but in the general case where the transmitter, receiver, and ionosphere could all be in motion relative to each other, the thresholds could be dynamic and derived from the motion parameters.

Some embodiments output binary determinations without any error bars or confidence intervals. But the binary thresholds could be replaced in some embodiments by linear or Gaussian-like probability distributions to provide numerical estimates of the likelihood of various fluctuation impacts on the signal, or confidence intervals on the determinations. For example, instead of binary spectral slope thresholds of −1.5 and −5.0 that are initially proposed as positive indicators of ionospheric scintillation, we could instead specify a Gaussian centered at −3.25 and dropping by 1/e at −1.5 and −5.0, and assigning a probability to the assessment based on the magnitude of the Gaussian for the observed spectral slope.

This would allow flagging of borderline cases while reporting them with a lower level of certainty. It is also readily conceivable and within the scope of the present invention to do the analysis in Fourier space and apply thresholds to the location, height, and width of various peaks, slopes, or features that appear in the spectrum. For example, white noise would represent a flat area in the spectrum at short time scales where receiver noise dominates over externally generated fluctuations in the signal.

First Embodiment

Figure 3:
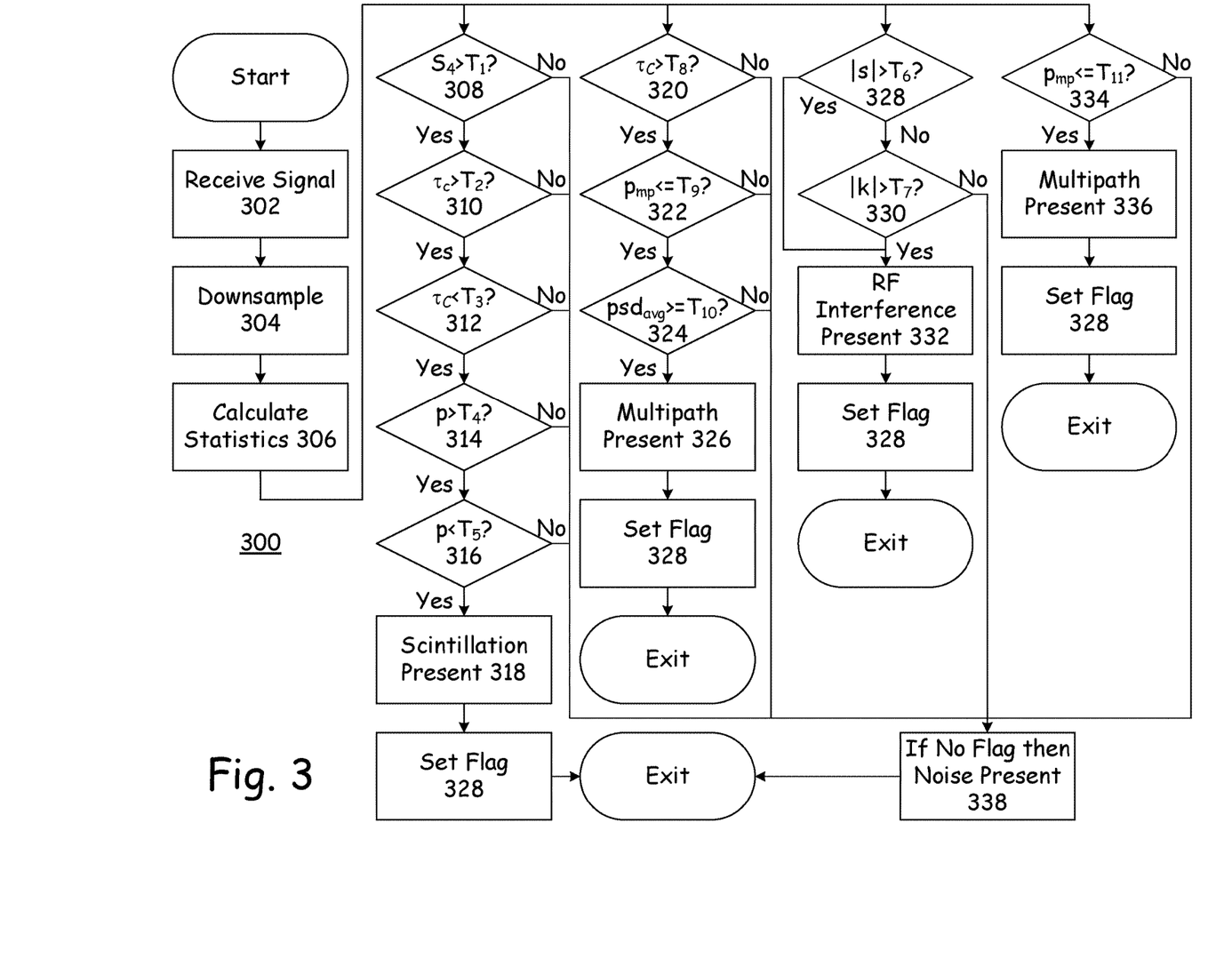
FIG. 3 is a flow chart of a second method for determining the sources of fluctuations in trans-ionospheric radio signals according to an embodiment of the present invention.

With reference now to FIG. 3, there is depicted a flowchart for a first embodiment of a method 300 according to the present invention. The various thresholds as described in this embodiment might be different from like-numbered thresholds described in other embodiments or elsewhere in this document.

This embodiment starts by receiving the radio signal on which the processing will be performed, as given in block 302. The signal can be a live signal, such as might be received from an antenna and radio receiver, or it can be a stored signal, such as might be received from a storage device such as a hard drive or other computerized storage apparatus. As depicted in block 304, the received signal is optionally down-sampled to some degree, such as by being decimated. Down-sampling the signal will tend to speed up the calculations that are to be performed in some embodiments, and thus might be preferred for live signal analysis. However, if sufficient processing power and memory are available, then down-sampling might not be needed.

Various statistics are then performed on at least a selected portion of the signal, as given in block 306. In some embodiments, the selected portion of the signal is long enough to capture a representative sample of the fluctuations that might be occurring in the signal. In some embodiments, the sampling interval for discriminating multipath fluctuations is larger than the sampling interval that is used for other parameters. For example, in some embodiments other parameters are computed based on about one minute of a sampled signal, but in other embodiments, determining multipath fluctuations might use a signal portion of twenty minutes to one hour. In some embodiments the statistics include at least one of mean, standard deviation, scintillation index, skew, kurtosis, decorrelation time, and spectral slope.

The calculated statistics are then compared to a series of thresholds, which are used to determine the likelihood of the presence of various different sources of fluctuations in the signal. In some embodiments all of the following sources are investigated and reported, and in other embodiments only one or some other subset of the following sources are investigated and reported. In some embodiments the order of investigation of the various sources of fluctuation is different from that as described below.

For example, in this embodiment, as depicted in block 308, the method 300 compares the scintillation index $S_4$ to a first threshold $T_1$. In some embodiments, the first threshold is 0.05. If the scintillation index is not greater than the first threshold, then the program flow falls to block 338 and, if no flag has been set as given in the various blocks 328, an indication of noise is reported by the method 300, and the program exits. However, if the scintillation index is greater than the first threshold, then the method 300 continues to analyze the potential sources of fluctuation in the signal by falling to the next analysis block.

As depicted in block 310, the method 300 compares the decorrelation time $-\tau_c$ to a second threshold $T_2$. In some embodiments, the second threshold is 0.1. If the decorrelation time is less than the second threshold, then the program flow falls to block 338 and, if no flag has been set as given in the various blocks 328, an indication of noise is reported by the method 300, and the program exits. However, if the decorrelation time is greater than the second threshold, then method 300 continues to analyze the potential sources of fluctuation in the signal by falling to the next analysis block.

As depicted in block 312, the decorrelation time $-\tau_c$ is compared to a third threshold $T_3$. In some embodiments, the third threshold is 10. If the decorrelation time is greater than the third threshold, then the method 300 falls to block 338 and, if no flag has been set as given in the various blocks 328, an indication of noise is reported by the method 300, and the program exits. However, if the decorrelation time is less than the third threshold, then the method 300 continues to analyze the potential sources of fluctuation in the signal by falling to the next analysis block.

As depicted in block 314, the method 300 then compares the signal spectral slope p to a fourth threshold $T_4$. In some embodiments, the fourth threshold is −5. If the spectral slope is less than the fourth threshold, the method 300 falls to block 338 and, if no flag has been set as given in the various blocks 328, an indication of noise is reported by the method 300, and the program exits. However, if the spectral slope is greater than the fourth threshold, then the method 300 continues to analyze the potential sources of fluctuation in the signal by falling to the next analysis block.

As depicted in block 316, the method 300 then compares the signal spectral slope p to a fifth threshold $T_5$. In some embodiments, the fifth threshold is −1.5. If the spectral slope is less than the fifth threshold, then the method 300 reports that scintillation is present in the signal, as given in block 318. However, if the spectral slope is greater than the fifth threshold, then the method 300 falls to block 338 and, if no flag has been set as given in the various blocks 328, an indication of noise is reported by the method 300, and the program exits.

The method 300 continues in block 320 where the decorrelation time $-\tau_c$ is compared to an eighth threshold $T_8$. In some embodiments, the eighth threshold is 10. If the decorrelation time is not greater than the eighth threshold, then the program flow falls to block 338 and, as described above, if no flag has been set as given in the various blocks 328, then an indication of noise is reported by the method 300, and the program exits.

However, if the decorrelation time is greater than the eighth threshold, then the method 300 next falls to block 322, where a value referred to as the multipath slope $p_{mp}$ is compared to a ninth threshold. In some embodiments the multipath slope is calculated using the decorrelation time and the spectral slope over a spectral range of about 0.0005 hertz to about 0.01 hertz. In some embodiments the ninth threshold is equal to about −1.2.

There are two different spectral slopes that are used in the method, one for the scintillation determination (denoted as p in the flowchart), and the other for multipath determination (denoted as $p_{mp}$ in the flowchart). They are both computed in the same way. However, the frequency range over which they are computed differs. This is because multipath typically presents as fluctuations with lower frequencies than those associated with scintillation. In one embodiment, the calculation of the multipath slope is done by computing the amplitude power spectrum via Fourier transform of the signal, fitting a line to the spectrum in the frequency ranges specified above, and then finding the slope of that line.

If the multipath slope is greater than the ninth threshold, then the program flow falls to block 338 and, as described above, if no flag has been set as given in the various blocks 328, then an indication of noise is reported by the method 300, and the program exits.

However, if the multipath slope is not greater than the ninth threshold, then the method 300 next falls to block 324, where a value referred to as the average power $psd_{avg}$ is compared to a tenth threshold. In some embodiments the average power is calculated from a power spectrum over a spectral range of about 0.0005 hertz to about 0.01 hertz. In some embodiments the tenth threshold is equal to about −80. If the average power is less than the tenth threshold, then the program flow falls to block 338 and, as described above, if no flag has been set as given in the various blocks 328, then an indication of noise is reported by the method 300, and the program exits.

However, if the average power is not less than the tenth threshold, then the method 300 falls to block 326 and reports that multipath fluctuations are present in the signal, after which the flag is set as given in block 328, and that portion of the program is exited.

As depicted, the absolute value of the signal skew s is compared to a sixth threshold $T_6$, as given in block 328. In some embodiments, the sixth threshold is 2.0. If the absolute value of the signal skew is greater than the sixth threshold, then the method 300 reports that RF interference is present in the signal, as given in block 328, after which the flag is set as given in block 328, and that portion of the program is exited.

If the absolute value of the signal skew is less than the sixth threshold, then the method falls to block 330, where the absolute value of the signal kurtosis k is compared to a seventh threshold $T_7$. In some embodiments the seventh threshold is 10. If the absolute value of the signal kurtosis is greater than the seventh threshold, then once again the method 300 reports that RF interference is present in the signal, as given in block 332, the flag is set as given in block 328, and that portion of the program is exited. However, if the absolute value of the signal kurtosis is not greater than the seventh threshold, then the program flow falls to block 338 and, as described above, if no flag has been set as given in the various blocks 328, then an indication of noise is reported by the method 300, and the program exits.

Thus, if either the absolute value of the signal skew or the absolute value of the signal kurtosis exceeds the sixth threshold or the seventh threshold, respectively, the method reports that RF interference is present in the signal. In some embodiments both the signal skew and the signal kurtosis are analyzed, regardless of whether the first parameter of the two to be analyzed indicates RF interference or not. In other embodiments, if the first parameter of the two to be analyzed indicates RF interference, then the other parameter is not analyzed. In some embodiments, the various parameters are not calculated until just before they are to be analyzed, and in other embodiments, all of the parameters are calculated at one time at the start of the method.

As depicted in block 334, the multipath slope is compared to an eleventh threshold. In some embodiments the eleventh threshold is equal to about −3. If the multipath slope is less than or equal to the eleventh threshold, then the method 300 reports that multipath interference is present in the signal, as given in block 336, and the flag is set as given in block 328. However, if the multipath slope is greater than the eleventh threshold, then the program flow falls to block 338 and, as described above, if no flag has been set as given in the various blocks 328, then an indication of noise is reported by the method 300, and the program exits.

Second Embodiment

Figure 1:
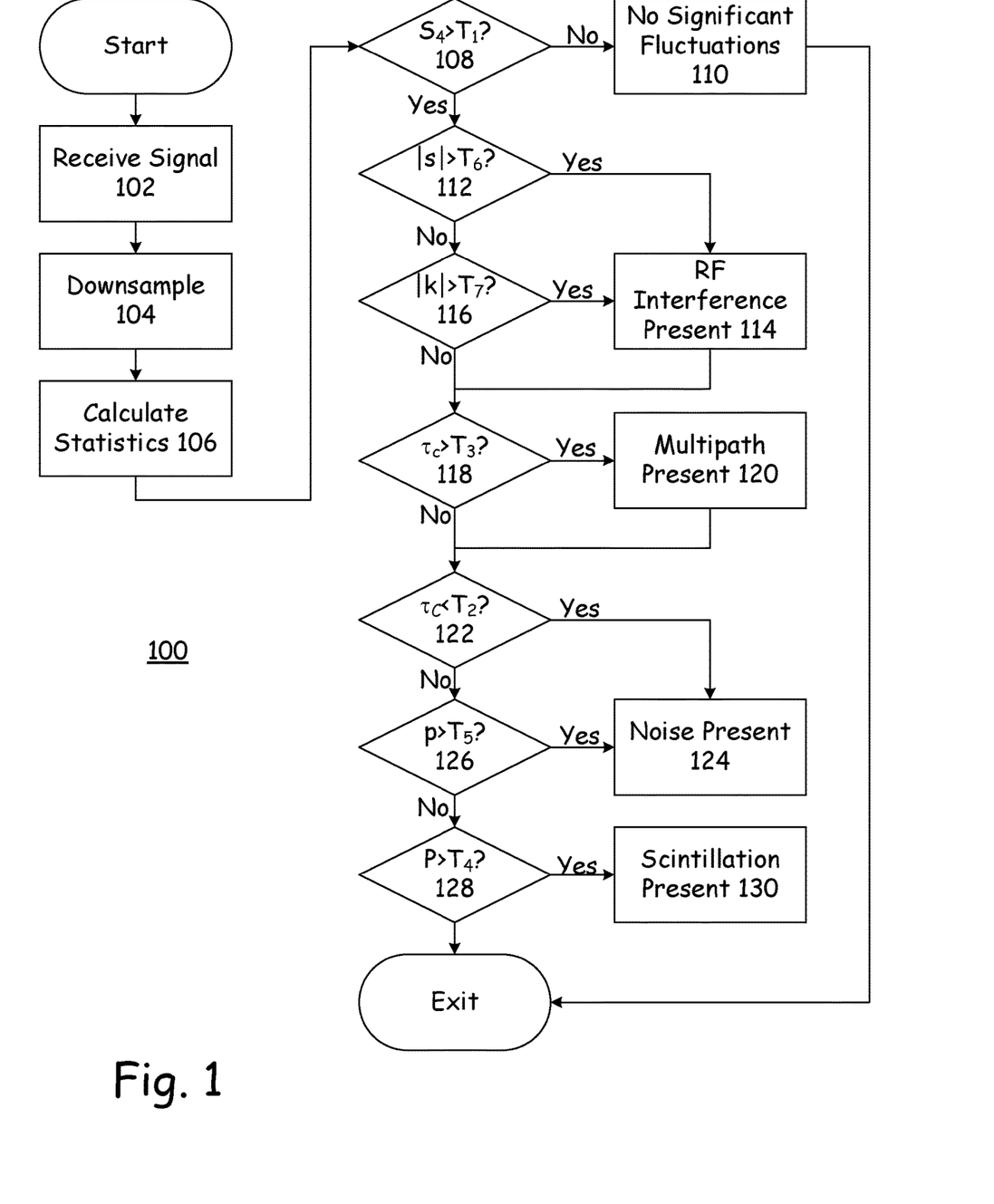
FIG. 1 is a flow chart of a first method for determining the sources of fluctuations in trans-ionospheric radio signals according to an embodiment of the present invention.

With reference now to FIG. 1, there is depicted a flowchart for a second embodiment of a method 100 according to the present invention. The various thresholds as described in this embodiment might be different from like-numbered thresholds described in other embodiments or elsewhere in this document.

This embodiment starts by receiving the radio signal on which the processing will be performed, as given in block 102. The signal can be a live signal, such as might be received from an antenna and radio receiver, or it can be a stored signal, such as might be received from a storage device such as a hard drive or other computerized storage apparatus. As depicted in block 104, the received signal is optionally down-sampled to some degree, such as by being decimated. Down-sampling the signal will tend to speed up the calculations that are to be performed in some embodiments, and thus might be preferred for live signal analysis. However, if sufficient processing power and memory is available, then down-sampling might not be needed.

Various statistics are then performed on at least a selected portion of the signal, as given in block 106. In some embodiments, the selected portion of the signal is long enough to capture a representative sample of the fluctuations that might be occurring in the signal. In some embodiments, the sampling interval for discriminating multipath fluctuations is larger than the sampling interval that is used for other parameters. For example, in some embodiments other parameters are computed based on about one minute of a sampled signal, but in other embodiments, determining multipath fluctuations might use a signal portion of twenty minutes to one hour. In some embodiments the statistics include at least one of mean, standard deviation, scintillation index, skew, kurtosis, decorrelation time, and spectral slope.

The calculated statistics are then compared to a series of thresholds, which are used to determine the likelihood of the presence of various different sources of fluctuations in the signal. In some embodiments all of the following sources are investigated and reported, and in other embodiments only one or some other subset of the following sources are investigated and reported. In some embodiments the order of investigation of the various sources of fluctuation is different from that as described below.

For example, in this embodiment, the scintillation index $S_4$ is compared to a first threshold $T_1$, as given in block 108. In some embodiments, the first threshold is 0.05. If the scintillation index is not greater than the first threshold, then the method 100 reports to the operator that there are no significant fluctuations in the signal, as given in block 110, and the method 100 exits. However, if the scintillation index is greater than the first threshold, then the method 100 continues to analyze the potential sources of fluctuation in the signal by falling to the next analysis block.

As depicted, the absolute value of the signal skew s is next compared to a sixth threshold $T_6$, as given in block 112. In some embodiments, the sixth threshold is 2.0. If the absolute value of the signal skew is greater than the sixth threshold, then the method 100 reports to the operator that RF interference is present in the signal, as given in block 114.

If the absolute value of the signal skew is less than the sixth threshold, then the method falls to block 116, where the absolute value of the signal kurtosis k is compared to a seventh threshold $T_7$. In some embodiments the seventh threshold is 10. If the absolute value of the signal kurtosis is greater than the seventh threshold, then once again the method 100 reports to the operator that RF interference is present in the signal, as given in block 114.

Thus, if either the absolute value of the signal skew or the absolute value of the signal kurtosis exceeds the sixth threshold or the seventh threshold, respectively, the operator is informed that RF interference is present in the signal. In some embodiments both the signal skew and the signal kurtosis are analyzed, regardless of whether the first parameter of the two to be analyzed indicates RF interference or not. In other embodiments, if the first parameter of the two to be analyzed indicates RF interference, then the other parameter is not analyzed. In some embodiments, the various parameters are not calculated until just before they are to be analyzed, and in other embodiments, all of the parameters are calculated at one time at the start of the method.

The method 100 then falls to block 118 where the decorrelation time $-\tau_c$ is compared to a third threshold $T_3$. In some embodiments, the third threshold is 10. If the decorrelation time is greater than the third threshold, then the method 100 reports to the operator that multipath fluctuations are present in the signal, as given in block 120. However, if the decorrelation time is less than the third threshold, then the method 100 continues to analyze the potential sources of fluctuation in the signal by falling to the next analysis block.

As depicted in block 122, the method 100 then compares the decorrelation time $\tau_c$ to a second threshold $T_2$. In some embodiments, the second threshold is 0.1. If the decorrelation time is less than the second threshold, then the method 100 reports to the operator that noise is present in the signal, as given in block 124. However, if the decorrelation time is greater than the second threshold, then the method 100 continues to analyze the potential sources of fluctuation in the signal by falling to the next analysis block.

As depicted in block 126, the method 100 then compares the signal spectral slope p to a fifth threshold $T_5$. In some embodiments, the fifth threshold is -1.5. If the spectral slope is greater than the fifth threshold, then the method 100 reports to the operator that noise is present in the signal, as given in block 124. However, if the spectral slope is less than the fifth threshold, then the method 100 continues to analyze the potential sources of fluctuation in the signal by falling to the next analysis block.

As depicted in block 128, the method 100 then compares the signal spectral slope p to a fourth threshold $T_4$. In some embodiments, the fourth threshold is -5. If the spectral slope is greater than the fourth threshold, then the method 100 reports to the operator that scintillation is present in the signal, as given in block 130. However, if the spectral slope is less than the fourth threshold, then the method 100 exits, as depicted.

Figure 2:
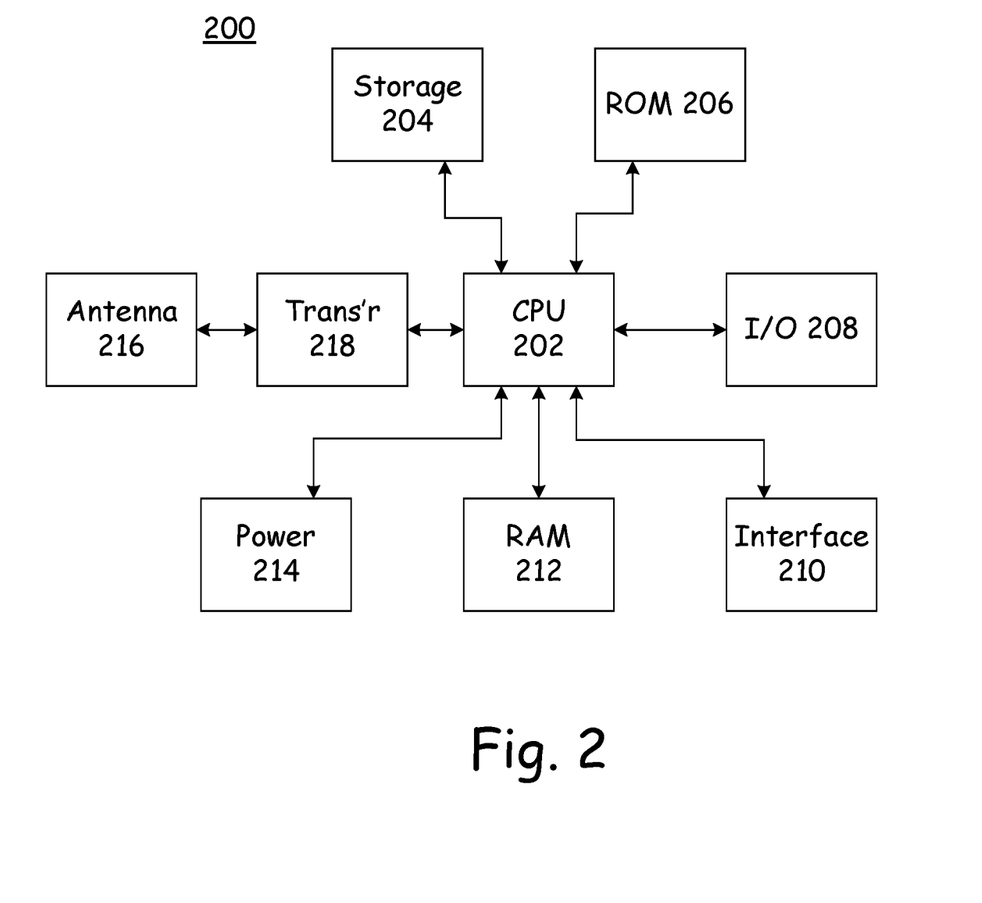
FIG. 2 is functional block diagram of an apparatus for determining the sources of fluctuations in trans-ionospheric radio signals according to an embodiment of the present invention.

With reference now to FIG. 2, there is depicted one embodiment of a computerized apparatus 200 capable of performing the actions as described herein. In this embodiment, the apparatus 200 is locally under the control of the central processing unit 202, which controls and utilizes the other modules of the apparatus 200 as described herein. As used herein, the word module refers to a combination of both software and hardware that performs one or more designated function. Thus, in different embodiments, various modules might share elements of the hardware as described herein, and in some embodiments might also share portions of the software that interact with the hardware.

The embodiment of apparatus 200 as depicted in FIG. 2 includes, for example, a storage module 204 such as a hard drive, tape drive, optical drive, or some other relatively long-term data storage device. A read-only memory module 206 contains, for example, basic operating instructions for the operation of the apparatus 200. An input-output module 208 provides a gateway for the communication of data and instructions between the apparatus 200 and other computing devices, networks, or data storage modules. An interface module 210 includes, for example, keyboards, speakers, microphones, cameras, displays, mice, and touchpads, and provides means by which the operator can observe and control the operation of the apparatus 200.

A random-access memory module 212 provides short-term storage for data that is being buffered, analyzed, or manipulated and programming instructions for the operation of the apparatus 200. A power module 214 is also provided in various embodiments of the apparatus 200. In some embodiment that power module 214 is a portable power supply, such as one or more batteries. In some embodiments the power module 214 includes a renewable source, such as a solar panel or an inductive coil that are configured to provide power or recharge the batteries. In other embodiments the power module 214 receives power from an external power source, such as a 110/220 volt supply.

Some embodiments of the apparatus 200 include a transceiver 218 and an antenna 216 for receiving, and optionally sending, the trans-ionospheric radio signals described herein. Indications of the sources of the fluctuations can be made in a variety of different ways, such as through the interface 210.

In one embodiment, the apparatus 200 receives stored trans-ionospheric radio signals through the input/output 208. In other embodiments, the apparatus 200 receives trans-ionospheric radio signals from the vibration antenna 216. In either embodiment, the apparatus 200 performs the functions as described herein, and then sends the data out through the input/output 208 for remote storage or further processing, or directly to the storage module 204. In some embodiments the steps of the method as described herein are embodied in a computer language on a non-transitory medium that is readable by the apparatus 200 of FIG. 2, and that enables the apparatus 200 to implement the process as described herein.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for automatically identifying the source of fluctuations in a trans-ionospheric radio signal, the method comprising the steps of:

acquiring a portion of the radio signal,
computing statistics on the portion of the radio signal, including mean, standard deviation, scintillation index, skew, kurtosis, decorrelation time, and spectral slope,
comparing the scintillation index, skew, kurtosis, decorrelation time, and spectral slope to thresholds, and
based at least in part upon the comparisons, selectively indicating at least one condition present in the portion of the radio signal, selected from the group of no signal fluctuations, RF interference, multipath interference, noise, and ionospheric scintillation.

2. The method of claim 1, wherein if the scintillation index is greater than a first threshold, and the decorrelation time is between a second threshold and a third threshold, and the skew is between a fourth threshold and a fifth threshold, then a condition of ionospheric scintillation is indicated.

3. The method of claim 1, wherein if an absolute value of the skew is greater than a sixth threshold, then a condition of RF interference is indicated.

4. The method of claim 1, wherein if an absolute value of the kurtosis is greater than a seventh threshold, then a condition of RF interference is indicated.

5. The method of claim 1, further comprising:
computing a multipath slope using the decorrelation time and the spectral slope over a spectral range of about 0.0005 hertz to about 0.01 hertz, and
computing an average of a power spectrum over a spectral range of about 0.0005 hertz to about 0.01 hertz,
wherein if the decorrelation time is greater than an eighth threshold, and the multipath slope is less than or equal to a ninth threshold, and the average power is greater than or equal to a tenth threshold, then a condition of multipath interference is indicated.

6. The method of claim 1, further comprising:
computing a multipath slope using the decorrelation time and the spectral slope over a spectral range of about 0.0005 hertz to about 0.01 hertz,
wherein if the multipath slope is less than or equal to an eleventh threshold, then a condition of multipath interference is indicated.

7. The method of claim 1, wherein if a condition of at least one of RF interference, multipath interference, and ionospheric scintillation is not indicated, then a condition of noise is indicated.

8. A non-transitory, computer-readable storage medium having stored thereon a computer program comprising a set of instructions for causing a computing device to indicate radio signal conditions by performing the steps of:
acquiring a portion of the radio signal,
computing statistics on the portion of the radio signal, including mean, standard deviation, scintillation index, skew, kurtosis, decorrelation time, and spectral slope,
comparing the scintillation index, skew, kurtosis, decorrelation time, and spectral slope to thresholds, and
based at least in part upon the comparisons, selectively indicating at least one condition present in the portion of the radio signal, selected from the group of no signal fluctuations, RF interference, multipath interference, noise, and ionospheric scintillation.

9. The non-transitory, computer-readable storage medium of claim 8, wherein the instructions comprise indicating a condition of ionospheric scintillation if the scintillation index is greater than a first threshold, and the decorrelation time is between a second threshold and a third threshold, and the slope is between a fourth threshold and a fifth threshold.

10. The non-transitory, computer-readable storage medium of claim 8, wherein the instructions comprise indicating a condition of RF interference if an absolute value of the skew is greater than a sixth threshold.

11. The non-transitory, computer-readable storage medium of claim 8, wherein the instructions comprise indicating a condition of RF interference if an absolute value of the kurtosis is greater than a seventh threshold.

12. The non-transitory, computer-readable storage medium of claim 8, the instructions further comprising:
computing a multipath slope using the decorrelation time and the spectral slope over a spectral range of about 0.0005 hertz to about 0.01 hertz,
computing an average of a power spectrum over a spectral range of about 0.0005 hertz to about 0.01 hertz, and
indicating a condition of multipath interference if the decorrelation time is greater than an eighth threshold, and the multipath slope is less than or equal to a ninth threshold, and the average power is greater than or equal to a tenth threshold.

13. The non-transitory, computer-readable storage medium of claim 8, the instructions further comprising:
computing a multipath slope using the decorrelation time and the spectral slope over a spectral range of about 0.0005 hertz to about 0.01 hertz, and
indicating a condition of multipath interference if the multipath slope is less than or equal to an eleventh threshold.

14. The non-transitory, computer-readable storage medium of claim 8, wherein the instructions comprise indicating a condition of noise if a condition of at least one of RF interference, multipath interference, and ionospheric scintillation is not indicated.

15. An apparatus for automatically identifying the source of fluctuations in a trans-ionospheric radio signal, the apparatus comprising:
an antenna for receiving a trans-ionospheric radio signal,
a receiver for receiving the radio signal,
a processor for,
computing statistics on the radio signal, including mean, standard deviation, scintillation index, skew, kurtosis, decorrelation time, and spectral slope, and
comparing the scintillation index, skew, kurtosis, decorrelation time, and spectral slope to thresholds,
a user interface for selectively indicating at least one condition present in the radio signal, selected from the group of no signal fluctuations, RF interference, multipath interference, noise, and ionospheric scintillation, based at least in part upon the comparisons, and
a memory for storing the thresholds.

16. The apparatus of claim 15, further comprising the processor for indicating a condition of ionospheric scintillation if the scintillation index is greater than a first threshold, and the decorrelation time is between a second threshold and a third threshold, and the slope is between a fourth threshold and a fifth threshold.

17. The apparatus of claim 15, further comprising the processor for indicating a condition of RF interference if an absolute value of the skew is greater than a sixth threshold.

18. The apparatus of claim 15, further comprising the processor for indicating a condition of RF interference if an absolute value of the kurtosis is greater than a seventh threshold.

19. The apparatus of claim 15, further comprising the processor for:
computing a multipath slope using the decorrelation time and the spectral slope over a spectral range of about 0.0005 hertz to about 0.01 hertz, computing an average of a power spectrum over a spectral range of about 0.0005 hertz to about 0.01 hertz, indicating a condition of multipath interference if the decorrelation time is greater than an eighth threshold, and the multipath slope is less than or equal to a ninth threshold, and the average power is greater than or equal to a tenth threshold, and indicating a condition of multipath interference if the multipath slope is less than or equal to an eleventh threshold.

20. The apparatus of claim 15, further comprising the processor for indicating a condition of noise if a condition of at least one of RF interference, multipath interference, and ionospheric scintillation is not indicated.

\* \* \* \* \*